3,380,785
BRAKE ARRANGEMENT
Ove Tjernström, Irsta, Sweden, assignor to Allmänna
Svenska Elektriska Aktiebolaget, Vasteras, Sweden, a
corporation of Sweden
Filed Nov. 23, 1964, Ser. No. 413,035
Claims priority, application Sweden, Dec. 4, 1963,
13,417/63
5 Claims. (Cl. 303—21)

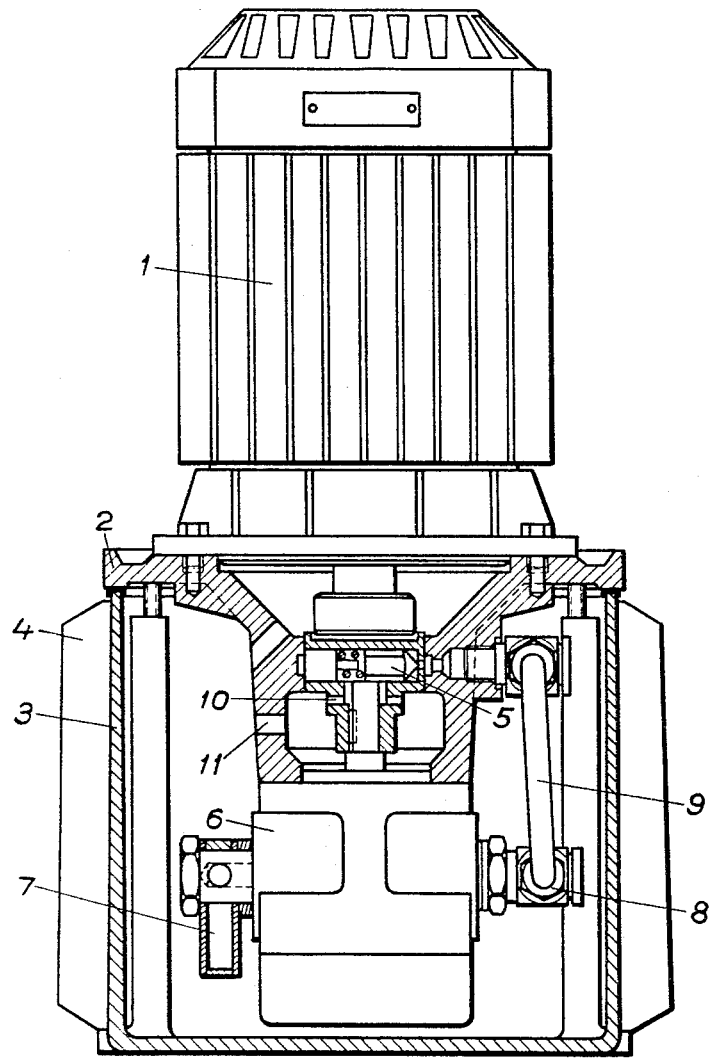

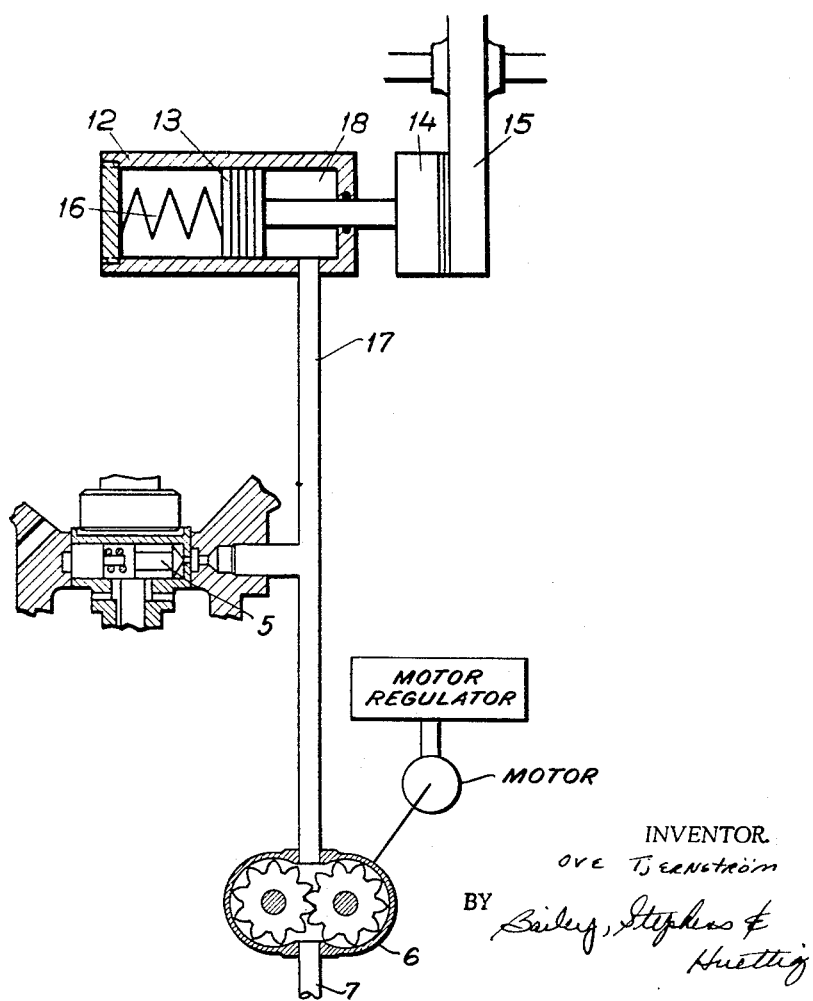

ABSTRACT OF THE DISCLOSURE

A motor control for a fluid released brake having a displacement pump driven by a motor and connected to a brake release cylinder and a centrifugal regulator valve for controlling the pressure in the connection from the pump to the cylinder, thus determining the fluid pressure to the release cylinder responsive to the speed of the motor.

The present invention concerns a brake arrangement comprising a pressure system connected to a brake unit, said brake unit being adapted to brake in response to diminishing pressure in said pressure system.

The object of the invention is to obtain a brake arrangement of the above mentioned type in which the pressure in the brake unit and hence the brake force can be regulated by regulating the speed of a motor and in which it is possible to obtain a very fast pressure drop in the pressure system and hence a very fast braking movement. This is obtained according to the invention by using in the pressure system a unit known per se comprising a driving motor, a displacement pump and a pressure regulating valve in the form of a centrifugal valve, said valve and pump being driven by said motor. The centrifugal valve makes it possible to obtain a relatively high pressure and to have at the same time a relatively big cross section in the regulator valve. This means that when the valve opens completely the pressure medium can flow very quickly through the valve due to its large cross sectional area and hence the pressure drop in the system will be very fast. The fast pressure drop which gives a fast braking movement is of decisive importance in the type of brakes discussed. The brake unit and the pressure unit which have to be combined in order to give a brake arrangement according to the invention are known per se but the said combination gives a brake arrangement which shows better technical qualities than any known brake.

The invention will be more fully described in the following with reference to the accompanying figure which schematically shows embodiments of the units of a brake arrangement according to the invention. FIGURE 1 shows the pressure unit and FIGURE 2 shows the connection between the pressure unit and the brake unit.

In FIGURE 1, 1 indicates the driving motor which is placed on the cover 2 of a container 3 which constitutes the pressure medium tank for the system. The container 3 is provided with cooling flanges 4. On the driving shaft of the motor a centrifugal valve 5 which is to one side of the axis of the shaft and is therefore urged outward by centrifugal force as the shaft rotates and a gear pump 6 are arranged. The centrifugal valve 5 and the pump 6 are fitted inside the pressure medium container 3, the cover 2 of which is formed so that it constitutes a housing surrounding the rotating part of the centrifugal valve 5 and an attachment base for the housing of the gear pump 6. The gear pump 6 has an inlet at 7 and an outlet at 8. The outlet 8 connects through a pipe 9 with the pressure side of the centrifugal valve 5. The pressure pipe (not shown) leading out from the pressure system is of course connected in a suitable way to the pressure side between the gear pump and the centrifugal valve.

The pressure in the pressure system is controlled by altering the speed of the driving motor with decreased speed the centrifugal force pressing the valve body of the centrifugal valve 5 against its seat is diminished, resulting in the valve no longer being able to maintain the same high pressure in the pressure system feeding the release cylinder. The pressure in the system falls in proportion to the decrease of speed. Since the gear pump 6 is a pure displacement pump, the pump speed does not itself determine the pressure of the pump, but the pump pressure is determined by the back pressure maintained by the centrifugal valve. When the pressure is desired to increase in the system, the speed of the driving motor is increased and the centrifugal power then forces the valve body of the centrifugal valve harder against its seat, upon which the pressure on the pressure side rises. From the centrifugal valve 5, the pressure medium flows through outlet ducts 10 and 11 out into the pressure medium container 3 and the cycle of the pressure medium is thereby completed.

FIGURE 2 shows the brake unit which comprises the brake cylinder 12, surrounding the reciprocating brake piston 13, which is connected to a brake block 14, braking against the brake disc 15. The brake force is generated by a brake spring 16 acting directly on the brake piston 13. For releasing the brake, pressure medium is supplied through a pipe 17 connected to the pressure chamber 18 of the brake cylinder. The pipe 17 is connected to the outgoing pressure pipe of the pressure unit. Only one brake cylinder is shown in the figure. Usually two brake cylinders mounted on opposite sides of the brake disc form a complete brake disc assembly. In such a case the pressure unit of FIGURE 1 can of course be connected to both the brake cylinders.

The invention is not limited to the embodiments shown, but many variations and modifications are feasible within the scope of the following claims.

I claim:
1. Variable motor control for hydraulic fluid operated brake comprising a driving motor and a regulator therefor, a displacement pump and a centrifugal regulator valve driven by said motor, a brake unit including brake means released by fluid pressure and actuated by permanently acting pressure supply means independent of hydraulic fluid pressure, a fluid pressure system including a conduit permanently connecting the output of said pump to said brake unit and a branch conduit connecting the fluid pressure system to said centrifugal regulator valve, said valve regulating the pressure in said fluid pressure system by draining hydraulic fluid from the pressure system in a quantity responsive to the speed of said motor.

2. Variable motor control arrangement according to claim 1, in which said centrifugal valve and said pump are connected to the same shaft, said shaft being directly connected to the shaft of said driving motor.

3. Variable motor control arrangement according to claim 2, having a housing enclosing said pump and valve, said driving motor being mounted directly on said housing.

4. Variable motor control arrangement according to claim 1, having a chamber which constitutes the pressure medium tank for said arrangement, said pump and valve being located in said chamber.

5. Variable motor control arrangements according to claim 1, said pressure system and said brake unit being separate units, and pipes connecting said units.

References Cited

UNITED STATES PATENTS

| | | | |
|---|---|---|---|
| 1,958,303 | 5/1934 | Hayes | 91—458 X |
| 1,993,613 | 3/1935 | Lum | 188—170 X |
| 2,382,263 | 8/1945 | Schnell | 188—170 |
| 2,769,432 | 11/1956 | Massey | 91—458 X |
| 3,133,531 | 5/1964 | Cramer | 91—458 X |

EUGENE G. BOTZ, *Primary Examiner.*

ARTHUR L. LA POINT, *Examiner.*